(12) United States Patent
Konishi (10) Patent No.: US 8,603,344 B2
(45) Date of Patent: Dec. 10, 2013

(54) METHOD AND APPARATUS FOR REMOVING METAL FROM WASTE WATER

(75) Inventor: Masayoshi Konishi, Chiyoda-ku (JP)

(73) Assignee: Sumitomo Osaka Cement Co., Ltd. (JP)

( * ) Notice: Subject to any disclaimer, the term of this patent is extended or adjusted under 35 U.S.C. 154(b) by 1240 days.

(21) Appl. No.: 12/084,308

(22) PCT Filed: Oct. 30, 2006

(86) PCT No.: PCT/JP2006/321685
§ 371 (c)(1),
(2), (4) Date: Apr. 28, 2008

(87) PCT Pub. No.: WO2007/052618
PCT Pub. Date: May 10, 2007

(65) Prior Publication Data
US 2010/0065502 A1    Mar. 18, 2010

(30) Foreign Application Priority Data

Oct. 31, 2005    (JP) ................. 2005-317272

(51) Int. Cl.
*C02F 1/461* (2006.01)
*C02F 1/42* (2006.01)
*C02F 1/70* (2006.01)
*B09B 3/00* (2006.01)

(52) U.S. Cl.
USPC ...... 210/748.01; 210/665; 210/201; 210/202; 210/719; 205/742; 204/233; 204/544

(58) Field of Classification Search
USPC ............. 205/696, 702, 554; 166/275; 422/22, 422/186, 186.04; 210/748.01, 660, 638, 210/639, 669, 806; 204/233, 294
See application file for complete search history.

(56) References Cited

U.S. PATENT DOCUMENTS

| | | | |
|---|---|---|---|
| 3,401,101 A | * | 9/1968 | Keller, Jr. ............ 205/696 |
| 4,527,626 A | * | 7/1985 | Cantu et al. ........... 166/275 |
| 2004/0195112 A1 | * | 10/2004 | Weakly et al. ......... 205/702 |

FOREIGN PATENT DOCUMENTS

| | | |
|---|---|---|
| JP | A-48-029267 | 4/1973 |
| JP | 54-30653 | 7/1979 |

(Continued)

OTHER PUBLICATIONS

"Fundamental Chemistry Library 2, Analytical Chemistry (Revised Edition)" p. 211, Shokabo Publishing Co., Ltd. 1985. Translation of Abstract.

(Continued)

*Primary Examiner* — Joseph Drodge
*Assistant Examiner* — Cameron J Allen
(74) *Attorney, Agent, or Firm* — Merchant & Gould P.C.

(57) ABSTRACT

The present invention has an object to provide a method and an apparatus for removing metals in waste water, such as thallium contained in waste water generated by rinsing waste containing chlorine, ash obtained by burning garbage, fly ash, etc. and reduces the concentration of metals in the waste water to a discharge standard, and the present invention provides a method for removing metals comprising applying direct-current electricity by an electrolyzer 5 to waste water S5, which contains metal aggregate, discharged via a reaction tank 1, a settler 2, and a reaction tank 4, and thereby the waste water S5 is electrolyzed together with depositing metals dissolve in the waste water S5 as metal oxides, separating the waste water containing deposited metal oxides in a precision filtration apparatus 6 into suspended solid MP and waste water S7, and removing a small amount of metals dissolve in the waste water S7 after removing the suspended solid MP in an ion exchange unit 7.

6 Claims, 3 Drawing Sheets

(56) References Cited

FOREIGN PATENT DOCUMENTS

| | | |
|---|---|---|
| JP | 55-111892 | 8/1980 |
| JP | A-03-224678 | 10/1991 |
| JP | 4-219194 | 8/1992 |
| JP | 06-121978 A | 5/1994 |
| JP | 10-151466 | 6/1998 |
| JP | 2000-51863 | 2/2000 |
| JP | 2003-1218 | 1/2003 |
| JP | 2003-13275 | 1/2003 |
| JP | 2003-27153 | 1/2003 |
| JP | 2003013275 A * | 1/2003 |
| JP | 2004-41939 | 2/2004 |
| JP | 2005-103518 | 4/2005 |
| JP | 2005-161188 | 6/2005 |
| JP | A-2007-117966 | 5/2007 |
| WO | WO 2004/079840 A2 | 9/2004 |
| WO | WO 2004079840 A2 * | 9/2004 |

OTHER PUBLICATIONS

European Search Report for European Patent Application No. 06822614.1 dated Apr. 29, 2011.

Japanese Office Action for corresponding Japanese Patent Application No. JP 2005-317272 mailed Jul. 12, 2011 (and English translation).

Notice of Allowance for corresponding Japanese Patent Application No. JP 2005-317272 mailed Jan. 4, 2012 (and English translation).

* cited by examiner

METHOD AND APPARATUS FOR REMOVING METAL FROM WASTE WATER

TECHNICAL FIELD

The present invention relates to a method and an apparatus for removing metals from waste water. Specifically, the present invention relates to a method and an apparatus for removing metals such as thallium, lead, cadmium, chromium, and mercury which are contained in waste water generated by rinsing waste containing chlorine or ash obtained by burning garbage, fly ash, and plastic products. The method and the apparatus are preferably used to improve the water quality.

Priority is claimed on Japanese Patent Application No. 2005-317272, filed Oct. 31, 2005, the content of which is incorporated herein by reference.

BACKGROUND OF THE INVENTION

In recent years, with an increase of interest in the global environmental, environmental measures have been emphasized in cement production equipment which uses industrial waste effectively, final disposal site of industrial waste, petrochemical plants, and various factories. For example, various methods and devices, which purify gas or waste water discharged from cement production equipment, final disposal site of industrial waste, factories, etc., are suggested and used in practice.

For example, a chlorine bypass device is installed in cement production equipment in order to remove volatile components such as chlorine contained in industrial waste.

The chlorine bypass device is a device for removing volatile components such as chlorine which is concentrated by repeating volatilization and condensation between a cement kiln and a preheater. In this chlorine bypass device, chlorine is removed from the cement kiln by bleeding exhaust gas from the bottom of a cement kiln, and cooling to form chlorine bypass dust in which volatile components containing a chlorine compound as a main component are solidified, and discharging the chlorine bypass dust.

Since the chlorine bypass dust which is produced in the chlorine bypass device contains many chlorine compounds and heavy metals. Therefore, when the chlorine bypass dust is reused as a cement raw material, the contained chlorine compounds, heavy metals, etc have to be removed.

As a disposal method for separating and recovering chlorine compounds from waste containing chlorine, for example, a method, which has a rinse step for rinsing the waste containing chlorine with water to perform solid-liquid separation, that is, elute a chlorine component and a lead component, an alkali elution step for eluting the lead component by adding an alkali solution in the filtered solid component together with filtering and separating calcium as a hydroxide, a lead removal step for adding the filtrate separated in the alkali elution step to the filtrate separated in the rinse step, and adding an sulfating agent to participate and remove lead, a calcium removal step for adding a carbonated source to the free lead filtrate to participate and remove calcium, and a salts recovery step for crystallizing chlorides by heating the filtrate to participate and recover chlorides, is suggested (Patent Document No. 1).

On the other hand, there is a possibility that environmental pollution such as soil pollution, may arise by the waste water containing heavy metals such as lead, cadmium, and chromium at the final disposal site of industrial waste and some factories.

There is a possibility that the waste water containing heavy metals not only worsens the water quality of a river, but also causes air pollution, soil pollution, etc. Therefore, it is necessary to remove heavy metals contained in waste water as much as possible to improve the water quality.

The waste water containing heavy metals also contains inorganic salts, organic halogenated compounds such as dioxin, endocrine disruptors which are called as environmental hormones, and persistent substances such as plastic material. Therefore, it is necessary to remove these substances to improve the water quality.

Also, a disposal apparatus for waste water containing heavy metals which has a heavy metal absorbing device for absorbing and removing heavy metal ions contained in the waste water using an iron based adsorbent, a deionization device for further removing the heavy metal ions remaining in the waste water from the heavy metal absorbing device, and a circulation means for returning the concentrated water discharged from the deionization device to the heavy metal absorbing device is suggested (Patent document No. 2).

In addition, a waste water disposal device which has a settler for adjusting pH and settling metals contained in the waste water as metal hydroxides using a non-ionic polymer aggregating agent, a neutralization tank for neutralizing the treated wastewater after settle of metal hydroxides, an electrolysis device for condensing the salts in the treated water by passing the neutralized treated water, and an evaporator for evaporating moisture component from the water obtained after concentration treatment for the salts to crystallize salts contained in the treated water is also suggested (Patent document 3).

[Patent document No. 1] Japanese Unexamined Patent Application, First Publication No. 2003-1218

[Patent document No. 2] Japanese Unexamined Patent Application, First Publication No. 2005-103518

[Patent document No. 3] Japanese Unexamined Patent Application, First Publication No. 2005-161188

DISCLOSURE OF THE INVENTION

Problems to be Solved

However, an alkali solution is added to a solid component, which is filtrated in a rinse step, to elute a lead component and filtrate and separate calcium as hydroxides, and the obtained filtrate is added to a filtrate, which is obtained in the rinse step, and a sulfating agent is added to precipitate and separate lead in a conventional disposal method for chlorine containing wastes. Therefore, there was a problem in that all heavy metals could not always be removed. In particular, it was difficult to separate heavy metals such as thallium using a sulfating agent or a reducing agent, etc. as sediment. Due to this, they often remain in filtrate together with chlorine compounds.

Therefore, when the filtrate is heated to crystallize, separate and recover chloride, there was a possibility that heavy metals such as thallium are incorporated into the collected chlorides.

In addition, heavy metal ions in waste water are adsorbed and removed using an adsorbent containing iron, or metals contained in waste water settle as metal hydroxides using a non-ionic polymer coagulant in conventional disposal equipment for waste water provided with heavy metal disposal equipment. Therefore, there was a possibility that waste water may be drained while containing heavy metals. For this reason, there was a possibility that the waste water could not be drained without a pretreatment such as a treatment for reducing the concentration of heavy metals in the waste water.

The present invention solves these problems, and has an object to provide a method and an apparatus for removing metals from waste water to improve the water quality by removing metals such as thallium, lead, cadmium, chromium, and mercury contained in waste water, which is produced when a chlorine containing waste, kitchen garbage burned ash, fly ash, or plastic burned ash is rinsed, and adjusting the concentration of these metals to a discharge standard or less.

Means for Solving the Problem

In order to solve the problems, the present invention provides a method and an apparatus for removing metals from waste water.

That is, the present invention provides a method for removing metals from waste water, wherein metals dissolve in waste water are deposited as metal oxides by energizing a direct current in the waste water, and the metal oxides are separated from the waste water.

In this method for removing metals from waste water, dissolved metals in waste water, which are not deposited by adjusting pH of waste water and using a reducing agent, are deposited as metal oxides and the metal oxides are separated from the waste water. Thereby, metals contained in waste water are removed efficiently, and it is possible to reduce the metal concentration in waste water. As a result, the water quality of the waste water is improved sufficiently to a discharge standard.

Another method for removing metals from waste water according to the present invention is a method for removing metals from waste water, wherein a reducing agent and a pH adjuster are added to waste water to make sediment containing metals dissolve in the waste water. A secondary waste water is obtained by separating the sediment from the waste water, and metals dissolve in the secondary waste water are deposited as metal oxides by energizing a direct current in the waste water. Thereafter, the metal oxides are separated from the secondary waste water.

In the method for removing metals from waste water, a reducing agent and a pH adjuster are added to waste water to make sediment containing metals dissolve in the waste water. Then, the secondary waste water is obtained by separating the sediment from the waste water. After that, metals dissolve in the secondary waste water, which are not precipitated with a general reducing agent and pH adjuster are deposited as metal oxides by energizing a direct current in the waste water. Then, the metal oxides are separated from the secondary waste water. Due to this, metals contained in the secondary waste water are removed efficiently. Thereby, it is possible to remarkably reduce the concentration of metals in the secondary waste water. As a result, the quality of the waste water of the secondary waste water is improved sufficiently to a discharge standard.

In these methods for removing metals from waste water, it is preferable that the metals dissolve in the waste water or the secondary waste water after separating the metal oxides be removed with an ion exchange resin.

In this method, since the metals dissolve in the waste water or the secondary waste water after separating the metal oxides are removed with an ion exchange resin, the metals contained in the waste water are removed in two stages using electrolysis and an ion exchange resin. Thereby, the quality of the secondary waste water is further improved.

As the waste water, industrial waste water produced by rinsing chlorine containing wastes, or at least one of industrial waste water produced by rinsing kitchen garbage burned ash, fly ash, and plastic burned ash is preferable.

In this method, since industrial waste water produced by rinsing chlorine containing wastes, or at least one of industrial waste water produced by rinsing kitchen garbage burned ash, fly ash, and plastic burned ash is used as the waste water. Therefore, metals contained in the waste water are removed efficiently and it is possible to reduce the concentration of metals in the waste water. As a result, quality of the waste water is further improved.

It is preferable that the metals dissolve in the waste water or the secondary waste water be deposited on electrodes by energizing a direct current in the waste water or the secondary waste water, and the deposited metals be removed from the waste water or the secondary waste water.

In this method, the metals dissolve in the waste water or the secondary waste water are deposited on electrodes by energizing a direct current in the waste water or the secondary waste water. Thereby, metals dissolve in the waste water or the secondary waste water can be removed efficiently. Therefore, it is possible to remarkably reduce the concentration of metals in the waste water or the secondary waste water. As a result, quality of the waste water or the secondary waste water is further improved.

The apparatus for removing metals from waste water of the present invention is an apparatus having a reaction tank in which waste water is stored, and a reducing agent and a pH adjuster are added to the stored waste water to make sediment containing metals dissolve in the waste water, a solid-liquid separator in which the sediment is separated from the waste water to obtain a secondary waste water, and an electrolysis apparatus in which metals dissolve in the secondary waste water are deposited as metal oxides by energizing a direct current in the secondary waste water, and the metal oxides are separated from the waste water.

In this apparatus, a reducing agent and a pH adjuster are added to the waste water stored in the reaction tank to make sediment containing metals dissolve in the waste water, the sediment is separated from the waste water to make the secondary waste water in the solid-liquid separator, and metals dissolve in the secondary waste water are deposited as metal oxides by energizing a direct current in the secondary waste water. The metal oxides are separated from the waste water in the electrolysis apparatus. Thereby, the concentration of metals in the waste water is remarkably reduced. As a result, the quality of the waste water is improved sufficiently to a discharge standard.

In this apparatus, it is preferable that an ion exchange resin for removing metals dissolve in the secondary waste water after separating the metal oxides be provided at the downstream of the electrolysis apparatus.

In the apparatus, the metals dissolve in the secondary waste water discharged from the electrolysis apparatus are further removed by the ion exchange resin. Thereby, the metals contained in the secondary waste water are moved by two steps in the electrolysis apparatus and the ion exchanged resin. Thereby, the concentration of metals in the waste water is further reduced. As a result, quality of the waste water is further improved.

Effects of the Present Invention

According to a method for removing metals in waste water, metals dissolve in the waste water are deposited as metal oxides by energizing a direct current in the waste water, and the metal oxides are separated from the waste water. Therefore, it is possible to efficiently remove metals contained in the waste water, and to remarkably reduce the concentration of metals in the waste water. Consequently, the quality of the waste water of the secondary waste water can be improved sufficiently to a discharge standard.

According to another method for removing metals in waste water, a reducing agent and a pH adjuster are added to the waste water to make sediment containing metals dissolve in the waste water, and the sediment is separated from the waste water to make a secondary waste water, metals dissolve in the secondary waste water are deposited as metal oxides by energizing a direct current in the secondary waste water, and the metal oxides are separated from the secondary waste water. It is possible to efficiently remove the metals contained in the secondary waste water, and the concentration of metals in the secondary waste water can be remarkably reduced. As a result, the quality of the waste water is further improved.

The apparatus for removing metals from waste water of the present invention has a reaction tank in which waste water is stored, and a reducing agent and a pH adjuster are added to the stored waste water to make sediment containing metals dissolve in the waste water, a solid-liquid separator in which the sediment is separated from the waste water to obtain a secondary waste water, and an electrolysis apparatus in which metals dissolve in the secondary waste water are deposited as metal oxides by energizing a direct current in the secondary waste water, and the metal oxides are separated from the waste water. Therefore, it is possible to efficiently remove metals contained in the waste water at a low cost. As a result, the quality of the waste water is improved sufficiently to a discharge standard with ease and at a low cost.

EXPLANATION OF REFERENCE SYMBOLS

| 1: reaction tank | 2: settler | 3: filter press |
|---|---|---|
| 4: reaction tank | 5: electrolyzer | 6: precision filtration apparatus |
| 7: ion exchange unit | 11: mixing tank | 12: filter press |
| S1-S7: waste water | M1: solution | D: chlorine bypass dust |
| W: water | C: demineralization cake | P: polymer coagulant |
| T: metal scavenger | MS: heavy metal sludge | MP: suspended solid |

BEST MODE FOR CARRYING OUT THE INVENTION

The best mode of the method and apparatus for removing metals in waste water of the present invention are explained with reference to the figures.

Moreover, the following embodiments are used to specifically explain the present invention, but the present invention is not limited to the following embodiments.

Figure 1:
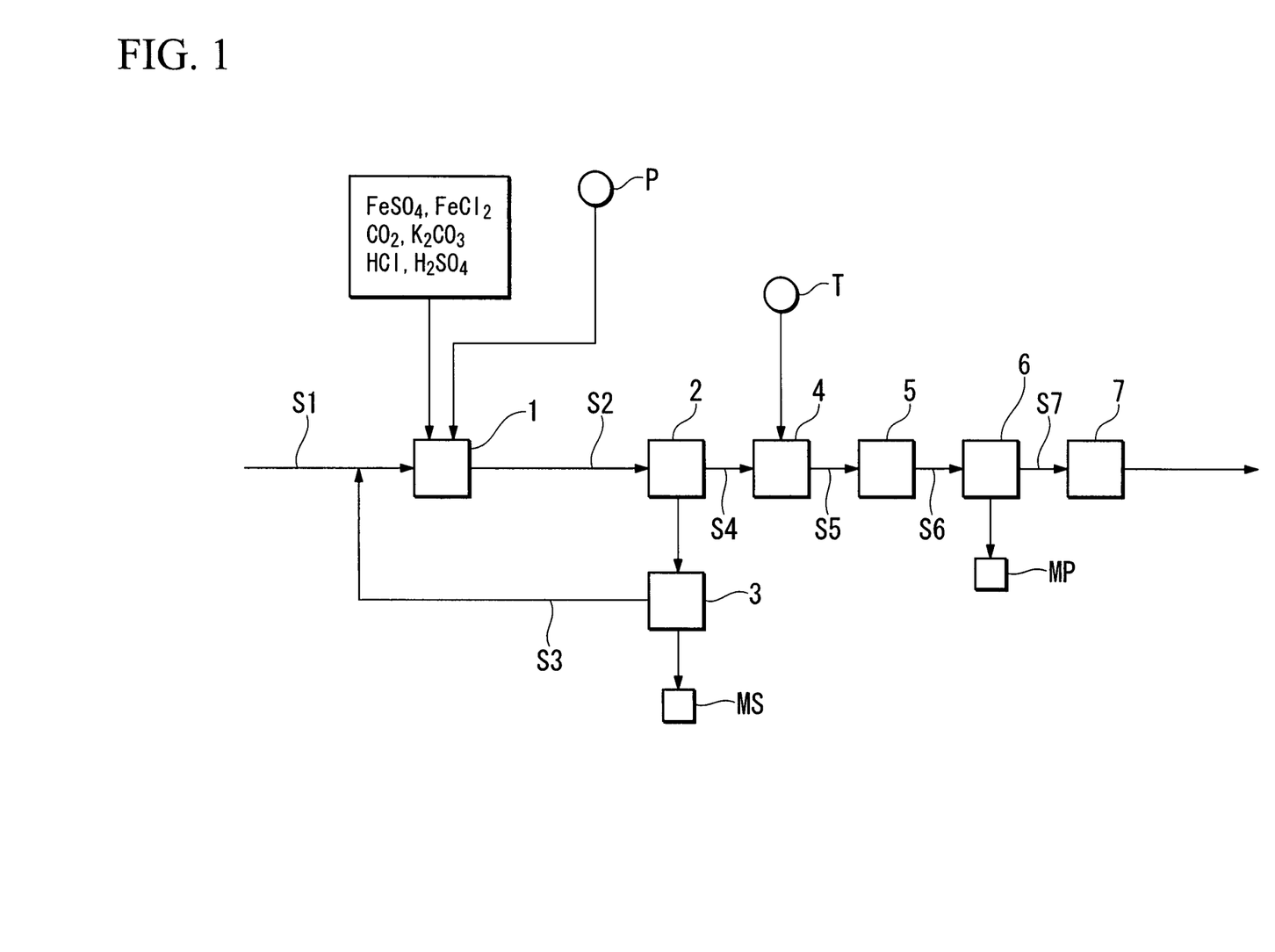
FIG. 1 is a schematic view showing one embodiment of the apparatus for removing metals from waste water of the present invention.

FIG. 1 is a schematic view showing one embodiment of the apparatus for removing metals from waste water of the present invention. The apparatus is one embodiment of an apparatus in which chlorine bypass dust discharged from a chlorine bypass device installed in cement production equipment is rinsed with water, and the waste water from which metals such as thallium, lead, copper, and zinc, are eluted, and the metals are removed.

The apparatus has a reaction tank 1 in which a reducing agent such as ferrous sulfate ($FeSO_4$) or ferrous chloride ($FeCl_2$), a pH regulator such as carbon dioxide ($CO_2$), potassium carbonate ($K_2CO_3$), hydrochloric acid (HCl), or sulfuric acid ($H_2SO_4$), or a polymer coagulant P, etc. is added to waste water S1 if necessary. The settler 2 in which a waste water S2 containing aggregate of calcium carbonate ($CaCO_3$) and heavy metals which are generated in the reaction tank 1 is settled to precipitate the aggregate containing calcium carbonate ($CaCO_3$) and heavy metals. In addition, the apparatus has a filter press 3 which takes out the sediment precipitated in the settler 2, and the sediment is pressurized and dewatered so as to be separated into sludge MS in a cake state containing calcium carbonate ($CaCO_3$) and heavy metals, and waste water S3. A reaction tank 4, in which a metal scavenger T is added to waste water S4 which is supernatant water discharged from the settler 2 to react and aggregate metals in the waste water S4, is also provided Furthermore, the apparatus has an electrolyzer (electrolysis means) 5 in which a direct current is applied to waste water S5 containing metal aggregate discharged from the reaction tank 4 to electrolyze the waste water S5 together with deposition of metals dissolve in the waste water S5 as metal oxides. A precision filtration apparatus 6 in which waste water S6 containing deposited metal oxides is separated using a membrane filter into a suspended solid MP containing the metal oxides produced by electrolysis and waste water S7 is provided. In addition, the apparatus has also an ion exchange unit 7 in which a small amount of metals dissolve in waste water S7 after removing the fine suspended solid MP in the precision filtration apparatus 6 is removed using an ion exchange resin.

Next, the method for removing the metals from waste water of the present invention (hereinafter called simply "a removing method") is explained referring FIG. 1.

The removing method of this embodiment is a method for removing metals contained in waste water from which metal components are eluted by rinsing chlorine bypass dust discharged from a chlorine bypass device installed in cement production equipment, wherein a reducing agent and a pH adjuster are added to the waste water to make sediment containing metals dissolve in the waste water. The sediment is separated from the waste water to make a secondary waste water, and metals dissolve in the secondary waste water are deposited as metal oxides by energizing a direct current in the secondary waste water. The metal oxides are separated from the secondary waste water.

This removing method is further explained in detail.

In the removing method of this embodiment, the waste water to be treated is waste water from which metallic components such as thallium, lead, copper, and zinc are eluted by rinsing burned ash and fly ash which are discharged from a municipal solid waste incinerator or an industrial waste incinerator, or dust containing chlorine compounds with high concentration obtained in a chlorine bypass device installed in cement firing equipment.

Here, the removing method and removing apparatus for waste water from which metallic components such as thallium, lead, copper, and zinc are eluted by rinsing chlorine bypass dust discharged from a chlorine bypass device installed in cement production equipment, will be explained.

"Waste Water to be Treated"

Figure 2:
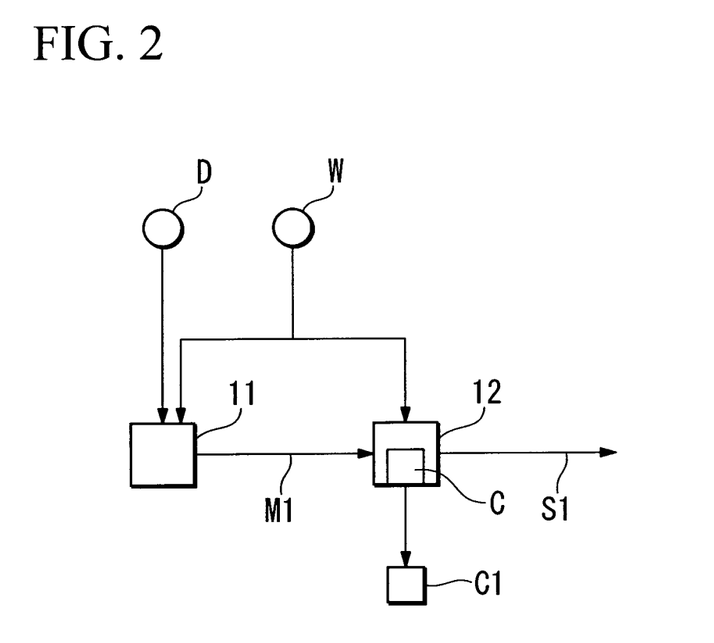
FIG. 2 is a schematic view showing one example of a rinse and filtration apparatus for rinsing and filtering chlorine bypass dust.

The waste water which is the target of processing is discharged from a rinse and filtration apparatus shown in FIG. 2.

The rinse and filtration apparatus is an apparatus in which water is added to bypass dust containing chlorine (chlorine containing waste) discharged from a chlorine bypass device installed in cement production equipment and mixed to obtain slurry, and the obtained slurry is separated by filtration into demineralization cake (solid component) and filtrate. The obtained demineralization cake is used as cement raw material. The rinse and filtration apparatus has a mixing tank 11 for mixing the bypass dust D containing chlorine and fresh water W (also referred to as "new water" hereafter) to produce a solution M1 and a filter press 12 for separating the solution M1 by pressure filtration into a demineralization cake C and waste water S1, and rinsing the obtained demineralization cake C with pressurized new water while being pressurized.

In the rinse tank 11, a certain amount of new water W, for example, two times to four times in weight of new water relative to the weight of the bypass dust D containing chlorine to be rinsed, is stored. Then, a certain amount of the bypass dust D containing chlorine is added and immersed in the new water, and stirred to rinse the bypass dust D. Thereby, soluble components such as chlorine compounds, thallium, lead, copper, and zinc, are eluted to produce a solution M1.

The reason for limiting the amount of the new water W poured in the rinse tank 11 to the range is that when the amount of new water W poured in the rinse tank is less than double the amount of the bypass dust D, elution of the soluble components in the dust is insufficient, and the amount of soluble components remaining in the demineralization cake C obtained by filtration in the latter filtration press 12 becomes large. In addition, the viscosity of the obtained solution M1 becomes high, and transferring the solution M1 to a next process using a pump becomes difficult.

In contrast, when the amount of new water W poured in the rinse tank is more than four times the amount of the bypass dust D, the amount of other components such as calcium or heavy metals, which are eluted, increases. Thereby, the amount of agents used to remove them in the next step increases.

The temperature in the rinse tank 11 in the rinse step my be controlled in a certain temperature range, but is not limited in particular. However, in order to raise the dissolution rate of the soluble components, the temperature is preferably 40° C. or greater.

In addition, the mixing time may be with a range sufficient to dissolve soluble components such as chlorine compounds, thallium, lead, copper, and zinc, which are contained in the chlorine bypass dust D, and it is preferably 10 hours or less. When they are mixed for 10 hours or longer, there is a possibility that double salts with calcium, an alkali component, and chlorine, which are contained in the dust, may generate, sediment may arise, and sufficient demineralization may not be performed. Therefore, mixing for 10 hours or longer is not preferable.

The solution M1 generated by the rinse step is separated into the demineralization cake C and the waste water S1 by the filter press 12.

When filtrating, it is preferable that moisture containing soluble components remaining in the demineralization cake C in the filter press 12 be rinsed with new water W. When the new water W is sent under pressure in one direction to the demineralization cake C while the filter press 12 is pressurized, the moisture can be rinsed efficiently with a small amount of water.

The amount of the new water W to be used to rinse is preferably 0.5 to 2.0 times the weight of the amount of the dust to be rinsed.

The amount of chlorine and soluble components such as thallium, lead, copper; and zinc contained in the demineralization cake C can be sufficiently reduced by rinsing with the new water W.

In addition, rinsed demineralization cake C1 has a relatively low moisture content. Therefore, the rinsed demineralization cake C1 can be sent directly to cement production equipment, mixed with other cement raw material, dried, and broken into powder to be reused as cement raw material powder in a cement calcination step. The obtained demineralization cake C is calcinated as cement clinker. Water used for rinsing the demineralization cake C is discharged as the waste water S1.

"Removal of Metals from Waste Water"

In the waste water S1 containing water discharged from the rinse and filtration apparatus, chlorine in the dust is eluted. In addition, the waste water S1 contains soluble components such as thallium, lead, copper, and zinc, calcium components, and chlorine components, in addition to chlorine eluted in the dust. Therefore, these components are removed.

The metal removing step is divided into the following three stages.

A. First Stage

The first stage is a stage for adding, for example, a reducing agent, a coprecipitater, or a pH adjuster to waste water, producing sediment containing the metals dissolve in the waste water, and separating the sediment from the waste water.

B. Second Stage

The second stage is a stage for electrolyzing the waste water together with depositing the metals dissolve in the waste water as metal oxides by energizing a direct current to perform electrolysis on the waste water in which the sediment was separated in the first stage, and separating the metal oxides.

C. Third Stage

The third stage is a stage for ion exchanging the waste water after separating metal oxides to remove the metals dissolve in the waste water.

These three stages are explained one by one.

"First Stage"

First, the waste water S1 containing the water discharged from the rinse and filtration apparatus after rinsing is poured in the reaction tank 1 as shown in FIG. 1. Then, in order to remove heavy metals and calcium components from the waste water S1, for example, an iron salt such as ferrous sulfate ($FeSO_4$) and ferrous chloride ($FeCl_2$) is added as a reducing agent and a coprecipitater. In addition, carbon dioxide ($CO_2$) is blown into the reaction tank 1 as a pH adjuster. Furthermore, potassium carbonate ($K_2CO_3$), hydrochloric acid (HCl), sulfuric acid ($H_2SO_4$), or a polymer coagulant P is added if necessary. Thereby, the above mentioned components are deposited as sediment containing hydroxides, etc.

For example, it is possible to remove considerably heavy metals by adjusting pH of the waste water S1 to about from 9 to 10.5 to make sediment containing hydroxides of heavy metals. Any pH adjusters may be used as long as it is acidic. Carbon dioxide is the most preferable. When carbon dioxide is used as a pH adjuster, calcium dissolve in the waste water S1 can be removed considerably.

When potassium carbonate ($K_2CO_3$) is added simultaneously with carbon dioxide ($CO_2$), the calcium dissolve in the waste water S1 can be thoroughly precipitated as calcium carbonate ($CaCO_3$), and can be removed. When potassium carbonate ($K_2CO_3$) is added, the salt collected finally is potassium chloride (KCl) having a high utility value.

In the present invention, the case in which salts in the waste water are also recovered is considered, and chemical substances suitably used can be selected. For example, when the salt recovered finally is potassium chloride (KCl), the utility value is high and preferable. Therefore, potassium carbonate ($K_2CO_3$) suitable for obtaining potassium chloride (KCl) is selected.

It is also possible to use sodium carbonate ($Na_2CO_3$) and sodium bicarbonate ($NaHCO_3$) instead of potassium carbonate.

In addition, when carbon dioxide ($CO_2$) cannot be prepared, the calcium dissolve in the waste water S1 may be treated only with potassium carbonate ($K_2CO_3$).

Subsequently, hydrochloric acid (HCl) or sulfuric acid ($H_2SO_4$) is added to the waste water containing calcium carbonate ($CaCO_3$) produced in these processes, and the reaction is further promoted.

After adding the polymer coagulant P in the filtrate in which the reaction is promoted, calcium carbonate ($CaCO_3$) and the heavy metals in the waste water are aggregated, and waste water S2 containing suspended solid is obtained.

The waste water S2 containing the aggregate of calcium carbonate ($CaCO_3$) and heavy metals, i.e., a suspended solid, is transferred to the settler 2, and left at rest for a certain period of time, preferably 3 to 5 hours. Thereby, calcium carbonate ($CaCO_3$) and heavy metals, which are the aggregates in the waste water S2, are precipitated.

After taking out the sediment of the setting tank 2, the sediment is sent to the filter press 3.

In the filter press 3, the sediment is pressurized to remove moisture, filtrated, and separated into a sludge MS in a cake state, which contains calcium carbonate ($CaCO_3$) and heavy metals, and waste water S3. The waste water S3 is added in the waste water S1 which is sent into the reaction tank 1, and this is used cyclically.

Moreover, the sludge MS containing heavy metals may be rinsed with new water after squeezing in the filter press 3.

On the other hand, waste water S4 which is supernatant water discharged from the settler 2 is sent to the reaction vessel 4, and the metal scavenger T is added. By reacting with the metal scavenger T, the waste water S4 becomes suspended waste water S5 which contains suspended material (SS components) of a few percents.

"Second Stage"

This suspended waste water S5 is sent to the electrolyzer 5. The waste water S5 is energized via the electrodes of the electrolyzer 5, and the waste water S5 is partially electrolyzed. Simultaneously metals dissolve in the waste water S5 are deposited as metal oxides to make a fine suspended solid. Thereby, the waste water S6 containing a suspended solid is obtained. In particular, when the metal dissolved is thallium (Tl), it oxidizes easily and becomes thallium oxide ($Tl_2O_3$).

Metals such as lead, copper, and zinc are deposited on the anode of the electrolyzer 5 by electrolysis, and they are removed from the waste water S5. Deposited metals such as lead are collected from the anode periodically.

The waste water S6 containing the suspended solid is sent to the precision filtration apparatus 6, the fine suspended solid MP which contains metal oxides is removed with a membrane filter (MF: micro filter), and waste water S7 having a concentration of the suspended material (SS components) of 1 mg/L or less is obtained. The waste water S7 contains thallium of about 0.5 to 3 ppm.

Similar to the rinse and filtration apparatus, the suspended solid MP may be rinsed with new water after squeezing in the filter press.

"Third Stage"

In order to remove a small amount of dissolved metals which remain in the waste water S7 discharged from the precision filtration apparatus 6, the waste water S7 is sent to the ion exchange unit 7, and the metals dissolve in a minute amount are adsorbed and removed from the waste water S7 using an ion exchange resin. Examples of the ion exchange resin include CR 11 and IRY.

With the ion exchange resin, metals such as thallium which remain in a minute amount even in the Second stage, are removed.

The concentration of thallium can be reduced to about 1/50 only by adsorption in the ion exchange unit. However, it is difficult to reduce the concentration of thallium to 0.1 ppm or less only with an ion exchange unit. In order to reduce the concentration of thallium to such a high level, the scale of the ion exchange unit must be enlarged.

However, the concentration of thallium contained in waste water can be further reduced in two stages, that is, by the electrolyzer 5 and the ion exchange unit 7. As a result, the quality of the waste water can be improved further, and the concentration of thallium in the waste water can be reduced to 0.1 ppm or less.

As explained above, metals such as thallium in a small amount contained in the waste water S7 are removed nearly thoroughly with the ion exchange resin. The concentration of metals such as thallium is reduced to 0.1 ppm or less. Then, the waste water S7 is discharged to the outside.

As explained above, according to the removing method for metals from waste water of this embodiment, electricity is applied to the waste water S5 in the electrolyzer 5, and the waste water S5 is partially electrolyzed. Simultaneously metals dissolve in the waste water S5 such as thallium (Tl) are deposited as metal oxides, and thereby the waste water S6 containing the suspended solid is produced. After that, the fine suspended solid MP containing metal oxides such as thallium oxide ($Tl_2O_3$) is removed from the waste water S6 with the precision filtration apparatus 6 to produce the waste water S7 having a concentration of the suspended material (SS components) of 1 mg/L or less. In addition, a minute amount of metals such as thallium remaining in the waste water S7 are absorbed and removed in the ion exchange apparatus 7. Thereby it is possible to reduce the concentration of thallium to 0.1 ppm or less. As a result, it is possible to efficiently remove heavy metals such as thallium contained in waste water, and the concentration of the heavy metals in the waste water can be reduced remarkably. Therefore, the quality of the waste water can be raised an effluent standard concentration or less.

The removing apparatus for metals from waste water of this embodiment has the electrolyzer 5 in which the waste water S5 is energized with a direct current, and metals dissolve in the waste water S5 are deposited as metal oxides together with partially electrolyzing the waste water S5. The precision filtration apparatus 6 in which the waste water S6 containing deposited metal oxides is separated into the suspended solid MP containing the metal oxides produced by electrolysis and the waste water S7 by using the membrane filter, and the ion exchange unit 7 in which a minute amount of metals dissolve in waste water S7 after removing the fine suspended solid MP in the precision filtration apparatus 6 are removed using an ion exchange resin. Therefore, heavy metals such as thallium contained in waste water can be removed efficiently and cheaply, and the concentration of heavy metals such as thallium can be reduced remarkably with ease. Therefore, the quality of the waste water can be raised to the effluent standard easily and cheaply.

EXAMPLES

Although the method and apparatus for removing metals from waste water will be explained in detail below, this invention is not limited by the following examples.

Moreover, waste water which was produced by rinsing chlorine bypass dust discharged from the chlorine bypass device installed in cement production equipment to elute metal components was used as waste water to be treated in examples. The composition of the chlorine bypass dust is shown in Table 1.

TABLE 1

| Item | Unit | Content |
|---|---|---|
| $SiO_2$ | % by weight | 8.1 |
| $Al_2O_3$ | % by weight | 2.5 |
| $Fe_2O_3$ | % by weight | 0.8 |
| CaO | % by weight | 30.9 |
| MgO | % by weight | 0.7 |
| $SO_3$ | % by weight | 4.6 |
| $Na_2O$ | % by weight | 1.6 |
| $K_2O$ | % by weight | 25.7 |
| Cl | % by weight | 20.8 |
| Cu | mg/Kg | 1,750 |
| Zn | mg/Kg | 813 |
| As | mg/Kg | 4 |
| Se | mg/Kg | 376 |
| Cd | mg/Kg | 168 |
| Hg | mg/Kg | 0.2 |
| Tl | mg/Kg | 800 |
| Pb | mg/Kg | 3,400 |

"Production of Waste Water to be Treated"

The waste water to be treated in this example was produced by rinsing the chlorine bypass dust and eluting metal components.

First, 300 parts by weight of water were added to 100 parts by weight of the dust having the composition shown in Table 1, and stirred to produce a dust slurry, while eluting soluble components such as chlorine compounds to repulp.

Subsequently, the dust slurry was squeezed by a filter press with a pneumatic pressure of 5 kg/cm$^2$, and 311 parts by weight of filtrate were obtained. While squeezing, 100 parts by weight of new water were sent to the demineralization cake in the filter press with force in a pneumatic transportation direction of the filtrate, and penetration rinsing of the demineralization cake was performed.

The yield of the demineralization cake obtained after rinsing with new water was 85 parts by weight, the content of water was 40%, the content of chlorine was 0.3%, and the demineralization percentage was 98.8%. The obtained demineralization cake obtained by these processes had very low content of chlorine, and was able to be reused as a cement raw material.

On the other hand, 415 parts by weight of the waste water containing the leachate and the rinse solution were obtained. The pH of the waste water was 13.1, the conductivity was 200 mS/cm, the content of potassium was 47.5 g/L and the content of chlorine was 46.2 g/L. The waste water contained about 730 ppm of calcium.

In addition, the waste water contained metals such as about 250 ppm of lead, about 30 ppm of copper, about 3 ppm of zinc, and about 80 ppm of thallium.

"Removal of the Metals from Waste Water"

The metals such as thallium, lead, copper, and zinc which were contained in the waste water were removed.

First, the waste water was poured into the reaction tank 1, and carbon dioxide was blown into the waste water to adjust the pH of the waste water to 9.5. Then, ferrous sulfate ($FeSO_4$) and potassium carbonate ($K_2CO_3$) were added and reacted in the waste water to produce waste water containing calcium carbonate ($CaCO_3$).

Subsequently, a polymer coagulant was added to the waste water, and calcium carbonate ($CaCO_3$) and the heavy metal in the waste water were aggregated. Thereby, suspended waste water containing aggregate was produced.

After that, the suspended waste water was moved to the settler 2, this was left at rest for three to five hours, and calcium carbonate ($CaCO_3$) and the heavy metal in waste water were precipitated.

Then, the sediment was taken out from the settler 2, this was pressured and dewatered in the filter press 3. Thereby, the sediment was separated into sludge in cake states containing calcium carbonate ($CaCO_3$) and heavy metals and filtrate.

The sediment obtained in the settler 2 contained many metal salts such as lead in addition to calcium. In addition, the filtrate after filtration in the filter press 3 was added to waste water S1 to be poured in the reaction tank 1 for reuse.

The waste water S4 which was supernatant water discharged from the settler 2 was moved to the reaction tank 4, and the metal scavenger was added to and reacted in the waste water S4.

Thereby, the waste water S4 became the suspended waste water S5 which contained suspended solid (SS components) at several percents or less. When the content of heavy metals in the waste water S5 was examined, the waste water S5 contained, in particular, about 50 ppm of thallium. At this stage, heavy metals such as thallium were not sufficiently collected.

After that, the waste water S5 was moved in the electrolyzer 5 and energized by impressing the direct current voltage of 3 volts via the platinum electrodes in the electrolyzer 5. Thereby, the waste water S5 was electrolyzed partially, and metals such as thallium (Tl) dissolve in the waste water were simultaneously deposited as metal oxides. As a result, the waste water S5 became the waste water S6 containing suspended solid.

It was confirmed that thallium in the waste water S6 was easily oxidized and changed to thallium oxide ($Tl_2O_3$).

During electrolysis, metals such as lead, copper, and zinc were deposited on the platinum electrodes. However, the recovery amount of these metals was small.

In addition, pH of the waste water during electrolysis was changed in a range from 8 to 13. However, a large difference was not observed in the amount of decomposition nor in the adsorption amount.

Figure 3:
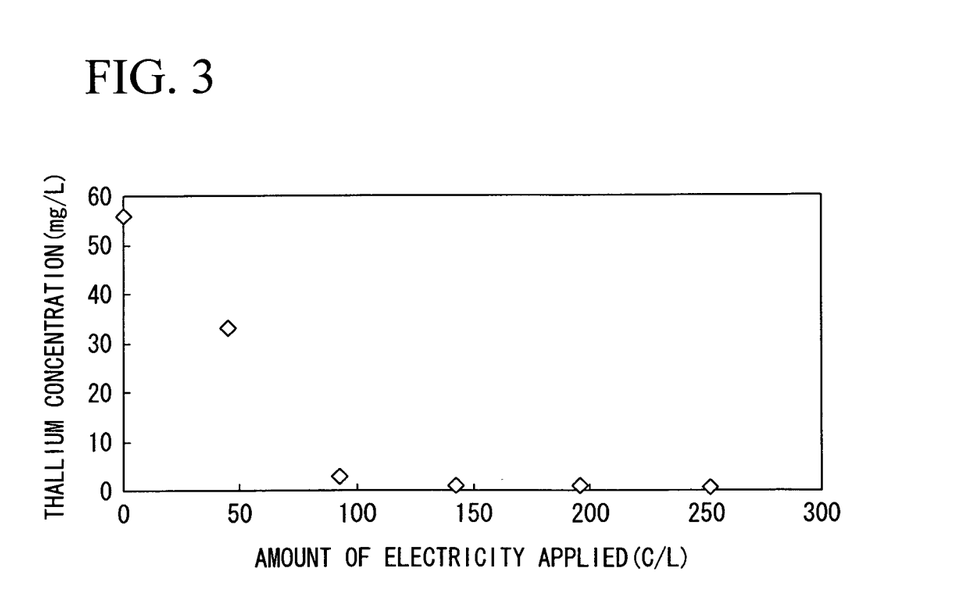
FIG. 3 shows the relationship between the amount of electricity applied and the thallium concentration in electrolysis of waste water.

The relationship between the quantity of electricity applied (C/L) and thallium concentration (mg/L) of the waste water in electrolysis is shown in FIG. 3.

FIG. 3 shows when quantity of electricity applied was 100 C/L and 140 C/L, 90% or greater, and 95% or greater of thallium was removed respectively.

Subsequently, the waste water S6 was moved to the precision filtration apparatus 6, and this was separated using the membrane filter (MF) into fine suspended solid MP containing thallium oxides which were deposited and suspended and the waste water S7 which was the filtrate. The suspended solid MP had high thallium purity. The thallium could be collected and effectively used.

The waste water S7 from which the suspended solid MP was removed with the membrane filter (MF), and having the concentration of thallium of 1 mg/L, was moved to the ion exchange unit 7. Then, metals such as thallium which remained very slightly in the waste water were removed with an ion exchange resin, such as CR11 and IRY.

The waste water discharged from the ion exchange unit 7 had a pH of 9.5, a conductivity of 200 mS/cm, a potassium content of 47.5 g/L, a chlorine content of 46.2 g/L, and a calcium content of 4 ppm.

In addition, the content of lead, copper, and zinc was 0.1 ppm or less respectively, and the content of thallium was 0.1 ppm or less.

Thereby, it was confirmed that a small amount of metals such as thallium remaining in the waste water were efficiently separated and collected by the electrolyzer 5 and the ion exchange unit 7.

In contrast, comparative treatment was conducted as follows. That is, the waste water S5 discharged from the reaction tank 4 was sent directly to the precision filtration unit 6 without the electrolyzer 5, and separated into fine suspended solid containing metals and waste water which was a filtrate. After that, the waste water was sent to the ion exchange unit 7, and metals remaining in the waste water were removed using the ion exchange resin such as CR11 and IRY.

Figure 4:
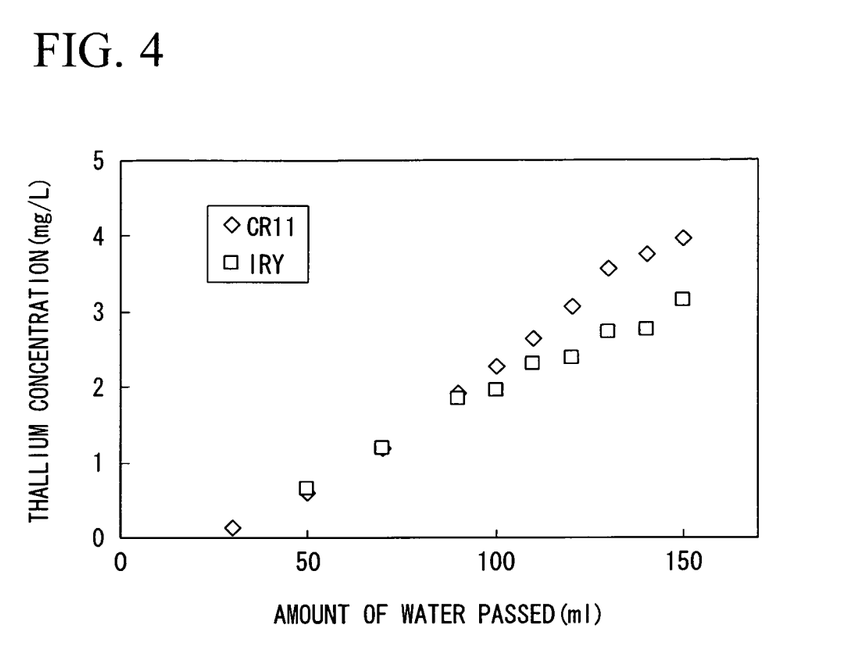
FIG. 4 shows the relationship between the amount of waste water passed and the thallium concentration in the ion exchange resin of waste water.

The relationship between the flow amount (mL) of the waste water containing thallium of 60 mg/L through the ion exchange resin and the thallium concentration after ion exchange is shown in FIG. 4.

FIG. 4 shows when the flow amount of the waste water is 30 mL, the thallium concentration is about 0.13 mg/L. However, in order to further reduce the thallium concentration to 0.10 or less mg/L, a very large ion exchange unit is needed, and waste water treatment cannot be performed efficiently and cheaply.

INDUSTRIAL APPLICABILITY

According to the method and apparatus for removing metals from waste water of the present invention, it is possible to improve the water quality by removing metals such as hallium, lead, cadmium, chromium, and mercury contained in waste water, which is produced when a chlorine containing waste, kitchen garbage burned ash, fly ash, or plastic burned ash is rinsed, and adjusting the concentration of these metals to a discharge standard or less.

In addition, according to the method and apparatus for removing metals from waste water of the present invention, it is possible to improve the quality of the waste water efficiently and cheaply.

Furthermore, according to the method and apparatus for removing metals from waste water of the present invention, many chlorine compounds and heavy metals can be removed. Therefore, when the method and apparatus of the present invention are used for chlorine bypass dust, the chlorine bypass dust can be reused as cement raw material.

The invention claimed is:

1. A method for removing metals in waste water, the method comprising:
adding a reducing agent and an acidic pH adjuster to the waste water to make sediment containing metals dissolve in the waste water;
obtaining a secondary waste water by alkali leaching to separate the sediment from the waste water;
depositing metals dissolved in the secondary waste water as metal oxides in a fine suspended solid by passing a direct current through the waste water;
separating the metal oxides from the secondary waste water,
wherein a metal removed from the waste water is thallium,
wherein the waste water is waste water produced by rinsing chlorine containing wastes, at least one of industrial waste water produced by rinsing kitchen garbage burned ash, fly ash, and plastic burned ash, or chlorine bypass dust, discharged from a chlorine bypass device installed in cement production equipment.

2. The method for removing metals in waste water according to claim 1, wherein the metals dissolved in the waste water or the secondary waste water after separating the metal oxides are removed with an ion exchange resin.

3. The method for removing metals in waste water according to claim 1, wherein the metals dissolved in the waste water or the secondary waste water are deposited on electrodes by passing a direct current through the waste water or the secondary waste water, and the deposited metals are removed from the waste water or the secondary waste water.

4. The method for removing metals in waste water according to claim 1, wherein the metals dissolved in the waste water after separating the metal oxides are removed with an ion exchange resin.

5. An apparatus for removing metals from waste water comprising:
a reaction tank in which waste water is stored, the reaction tank fitted with a means for adding a reducing agent and an acidic pH adjuster are added to the stored waste water and a means to subject the waste water to an alkali leaching to make sediment containing metals dissolve in the waste water;
a solid-liquid separator fitted with means for separating in which the sediment is separated from the waste water to obtain a secondary waste water; and
an electrolysis apparatus fitted with means by in which metals dissolved in the secondary waste water are deposited as metal oxides in a fine suspended solid by passing a direct current through the secondary waste water, and means by which the fine suspended solid is separated from the waste water,
wherein a metal removed from the waste water is thallium, and wherein the waste water is waste water produced by rinsing chlorine containing wastes, at least one of the industrial waste water produced by rinsing kitchen garbage burned ash, fly ash, and plastic burned ash, or chlorine bypass dust discharged from a chlorine bypass device installed in cement production equipment.

6. An apparatus for removing metals in waste water according to claim 5, wherein an ion exchange resin for removing metals dissolved in the secondary waste water after separating the metal oxides is provided at the downstream of the electrolysis apparatus.

* * * * *

UNITED STATES PATENT AND TRADEMARK OFFICE
CERTIFICATE OF CORRECTION

| | | |
|---|---|---|
| PATENT NO. | : 8,603,344 B2 | |
| APPLICATION NO. | : 12/084308 | |
| DATED | : December 10, 2013 | |
| INVENTOR(S) | : Masayoshi Konishi | |

It is certified that error appears in the above-identified patent and that said Letters Patent is hereby corrected as shown below:

On the title page item (75) Inventor: "Masayoshi Konishi, Chiyoda-ku (JP)" should read -- Masayoshi Konishi, Narashino-shi (JP) --

Signed and Sealed this
First Day of July, 2014

Michelle K. Lee
*Deputy Director of the United States Patent and Trademark Office*